June 13, 1967 — G. R. BIRD — 3,325,649
RADIATION RESPONSIVE APPARATUS FOR MONITORING A WEB
Filed Aug. 28, 1964 — 2 Sheets-Sheet 1

CONTROLLED COATING OUTPUT

INVENTOR
George R. Bird

BY Brown and Mikulka and Robert M. Ford

ATTORNEYS

United States Patent Office 3,325,649
Patented June 13, 1967

3,325,649
RADIATION RESPONSIVE APPARATUS FOR
MONITORING A WEB
George R. Bird, Concord, Mass., assignor to Polaroid
Corporation, Cambridge, Mass., a corporation of Delaware
Filed Aug. 28, 1964, Ser. No. 392,840
12 Claims. (Cl. 250—219)

The present invention relates to apparatus adapted for the monitoring of a continuous web and, more particularly, to apparatus adapted for the continuous monitoring of a travelling web possessing selective spectral absorption characteristics.

In the manufacture of continuous strip material, or webs, which comprise a single stratum or a plurality of superposed strata, or laminae, it is desirable to possess apparatus particularly adapted to monitor the physical parameters, such as the relative thickness and uniformity of the individual strata constituting the web material. It is particularly desirable to provide for the continuous monitoring of the web, concurrent with the fabrication of same, in order to specifically modulate, and control, the production process in strict accordance with the product specifications desired.

Accordingly, it is a principal object of the present invention to provide apparatus particularly adapted for the continuous monitoring of a web comprising a single stratum or a plurality of superposed strata.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

In accordance with the present invention, apparatus particularly adapted for the continuous monitoring of a web having electromagnetic radiation absorptive characteristics comprise an inspection station and means for moving the web past the inspection station. The inspection station includes means for providing electromagnetic radiation incident on one surface of a section of the web, passing the inspection station, generally extending transversely to the motion of the web past the station. Reflecting means are provided, contiguous the opposite surface of that section of the web receiving radiation, for reflecting radiation incident thereon in the direction of detector means adapted to produce, or generate, a signal substantially only in response to the intensity of reflected electromagnetic radiation of selected frequency range incident thereon. Simultaneous with the irradiation of the web, there is additionally provided, by the radiation providing means, electromagnetic radiation incident on one surface of a standard, or control, material having selected radiation absorption characteristics, standardized in correlation with the desired parameters of the continuous web. Reflecting means are provided contiguous the opposite surface of the control material for reflecting radiation incident thereon in the direction of the detector means. Intermediate the detector and each of the reflecting means, in the path of reflected radiation, there is provided means adapted to effect, or provide, sequential impingement of reflected electromagnetic radiation on the detector means.

Figure 2:
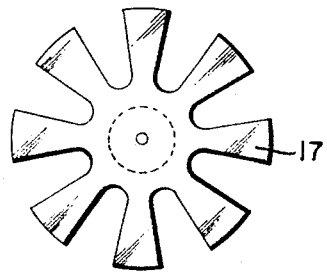
FIG. 2 is a diagrammatic front view, along line 2—2 of FIGURE 1, showing an embodiment of a reflector blade chopper disc employed in apparatus constructed in accordance with FIGURE 1.
Figure 1:
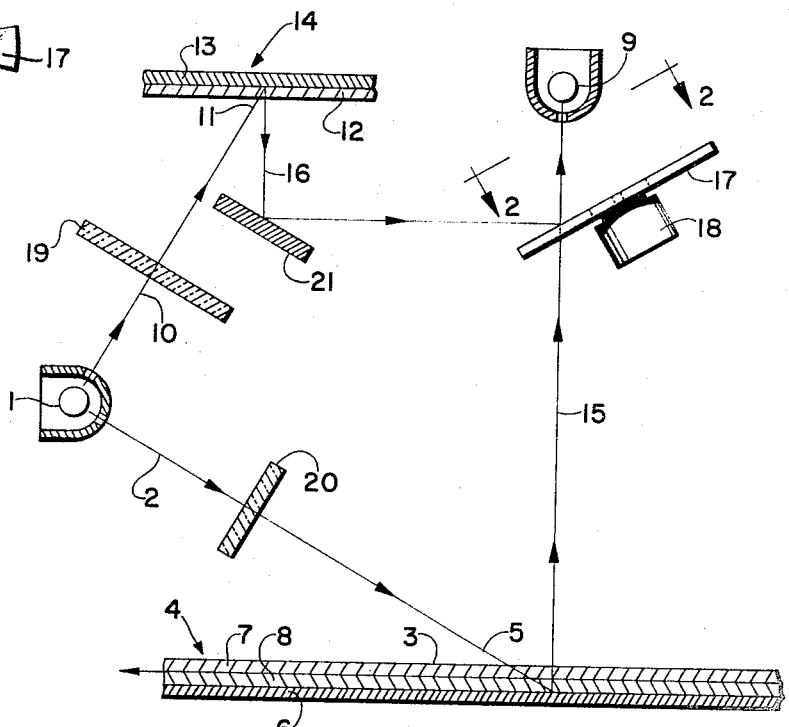
FIGURE 1 is a diagrammatic cross-sectional view showing an embodiment of apparatus constructed in accordance with the present invention.

As shown in FIGS. 1 and 2, an apparatus of the present invention is illustrated in its employment for the continuous monitoring of the thickness and integrity of a stratum of a travelling web at an inspection station. Reference numeral 1 represents an electromagnetic radiation energy source, such as a source of light, either visible, ultraviolet, or infrared radiation, or a source of other similar forms of electromagnetic radiation capable of reflection. For purposes of explanation, it will be assumed hereafter that energy source 1 is adapted selectively to provide a continuous output of actinic energy, but it will be apparent to those skilled in the art, from the description set forth, that the apparatus of the present invention may employ other forms of electromagnetic radiation.

Actinic energy from radiation source 1, for example, a light source such as a mercury arc lamp, is illustrated as concentrated and directed, in the instance shown and detailed hereinafter as the test instance, in the narrow beam represented by solid line 2 onto the upper surface 3, of a continuous, moving web 4, at section 5 of the web, which section preferably extends transverse to the movement of the web.

Web 4, as illustrated, comprises a three-ply, or three-layer, element including a layer, or stratum, 6, adapted to reflect actinic radiation incident thereon, having radiation absorptive layers, or strata, 7 and 8, each having different actinic radiation absorption maximum frequencies, superposed on, and contiguous, a surface of reflective layer 6 and directly in the path of actinic radiation test beam 2.

In the operation of the apparatus, test beam 2, incident on section 5, of exposed surface 3, traverses into and through respective radiation absorptive layers 7 and 8, and the unabsorbed portion of test beam 2, incident on the surface of reflecting layer 6, next adjacent radiation absorptive layer 8, is reflected back through radiation absorptive layers 7 and 8, in the direction of detector 9. The detector, for example, a photocell or photomultiplier tube, is preferably positioned such that no direct, specular reflection from surface 3 of radiation absorptive layer 7, but merely diffuse radiation, enters the acceptance cone of detector 9. Although the present invention is detailed herein in terms of a preferred embodiment employing reflection of diffuse radiation, it will be recognized that reflected specular radiation may be employed where desired.

Simultaneous with the foregoing, actinic energy from radiation source 1 is directed, as stated hereinbefore, in the instance shown and detailed hereinafter as the standard instance, in the narrow beam represented by solid line 10 incident on section 11, of the exposed surface of radiation absorptive layer, or material, 12, selected to have a radiation absorption maximum at a frequency range directly correlated to the desired parameters of one of layers 7 and 8, which for purposes of illustration hereinafter may comprise, for example, radiation absorptive layer 8. Standard beam 10, incident on section 11 of the exposed surface of layer 12, traverses into and through layer 12, and the unabsorbed portion of standard beam 10 is reflected upon contact with reflecting layer 13, contiguous the opposite surface of layer 12, back through layer 12 and into the acceptance cone area of detector 9.

Directly in the path of the reflected radiation beams 15 and 16, intermediate detector 9 and each of test element 4 and standard element 14, there is positioned a reflecting blade chopper disc 17 having a concentric plurality of equidistant, spaced, transmission opaque, reflecting surfaces, or arms, driven by a motor 18, as shown, in order to provide, in alternative sequence, interruption of the impingement of reflected test beam 15, on detector 9, and reflection of reflected standard beam 16, into engagement with detector 9.

There is provided by detector 9 an output signal, the value of which will at any time correspond to the intensity of reflected radiation at that particular instance incident on the detector. The signal generated, for example, a voltage signal produced by a photoelectric cell directly indicates the dimension of voltage change occurring between the incident test beam 15 and standard beam 16. Proper phasing of the incidence of the synchronized beams, in relation to the test components employed, may be obtained in an obvious manner by adjusting the relative rotating speed of chopper disc 17 and/or the surface area parameters and spacial distances of the blades.

Intermediate radiation source 1 and detector 9, there may be suitably positioned one or more radiation filtering elements, such as those designated 19 and 20, adapted to remove radiation frequencies, from beams 2 and 10, other than those selected for impingement on, and measurement by, detector 9, for example, other than those substantially corresponding to the absorption frequency range of monitored layer 8 and/or absorption standard layer 12 selected. It will be recognized that, where desired, for example, in the presence of extraneous radiation of such frequency as to contaminate, or affect, the response of the detector, then the inspection station may be suitably enclosed, or shielded, from such radiation.

The path of an employed radiation beam may be suitably channelled, or directed, by, for example, suitably positioning reflecting elements, such as shown in FIGURE 1, with reference to the control or reflected radiation standard beam 16's path, by continuous reflection from mirror element 21 and, as previously described, intermittent reflection from radiation chopper disc 17.

Figure 4:
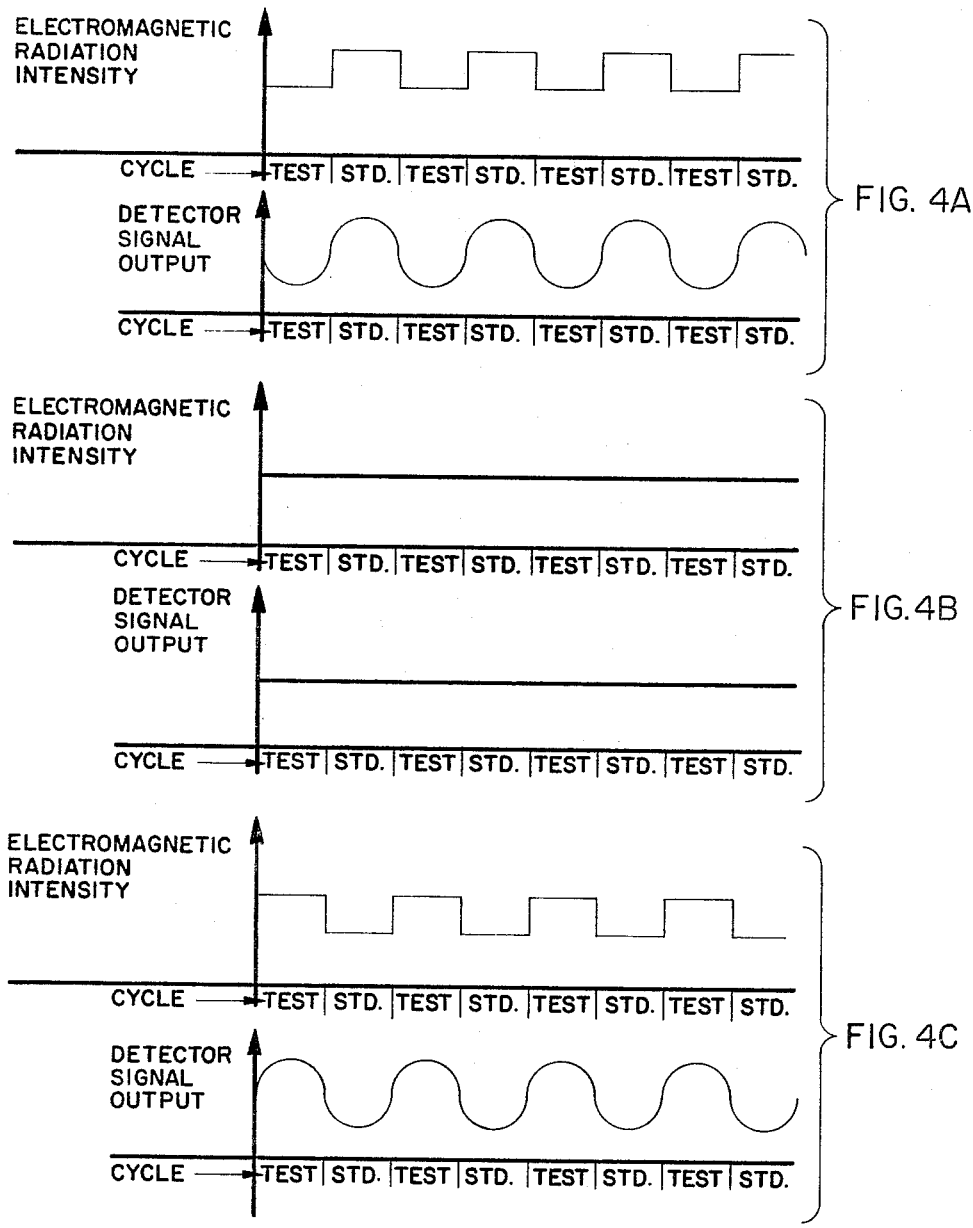
FIGS. 4A, 4B and 4C are graphic illustrations exhibiting signal wave forms developed during operation of apparatus constructed in accordance with FIGURE 1 and employed in accordance with the schematic representation of FIG. 3.

As shown in FIG. 4, three sets of curves, denoted A, B and C, are set forth to schematically illustrate the relative relation between the reflected electromagnetic radiation input impressed on the detector and the resultant generated signal ouput, under three selected, and separate, sets of conditions, or situations, that is, where the intensity of the reflected test beam incident on the detector is less than that of the reflected standard beam, where the intensity of each reflected beam is substantially identical, and where the intensity of the test beam is in excess of that of the standard beam. In each instance detailed, the upper graph of each set of curves displays a curve plotted to indicate the relative intensities of the reflected, sequential test and standard beams incident on the detector, while the lower graph displays the resultant signal wave form produced by the detector. Specifically, in FIG. 4A, the reflected test beam, incident on the detector, is shown as displaying an intensity less than that of the standard beam and, as a result, providing a detector output signal exhibiting the wave form illustrated. As shown in FIG. 4B, where the intensity of the reflected test beam, incident on the detector, is substantially equal in intensity to that of the standard beam, the individual signal wave form levels produced by the sequential impingement of the beams are substantially identical and, as a result, the level of the detector output signal generated is relatively unvarying. As shown in FIG. 4C, where the intensity of the reflected test beam, incident on the detector, is in excess of that of the standard beam, the detector generates a resultant signal wave form of the type illustrated.

Figure 3:
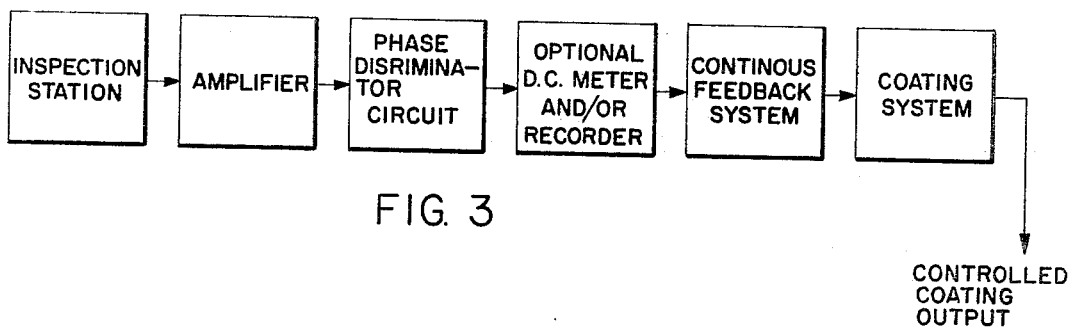
FIG. 3 is a schematic block diagram illustrating an employment of apparatus constructed in accordance with FIGURE 1.

As illustrated in FIG. 3, the output signal generated by the detector may be employed as the input of an amplifier to provide an amplified alternating current measuring signal output, which then may be impressed on a phase discriminator circuit to provide a unidirectional, or direct current measuring signal, or voltage, whose polarity is determined by the phase of the amplified alternating current measuring signal wave form and whose magnitude is proportionate to the amplitude of the wave form.

In this event, the test signal wave form of given amplitude, impressed on the phase discriminator circuit, is split in phase such that the corresponding phase of applied reference, or standard, signal wave form combines with, and is in phase coincident with, test signal wave form to provide a ratio resulting in a measuring signal, or voltage, yield which has a magnitude and polarity determined by the difference between opposing signals. The measuring signal, or voltage, thus provides an index signal both as to the phase and amplitude of the test signal, or voltage, and thus the relative intensity of the analyzing test beam.

The amplitude and phase of the measuring signal, or voltage, then may be directly read out by impression of the generated signal on, for example, a conventional D.C. meter and/or recorder; and/or the generated signal may be directly fed into a linear feed-back system adapted to provide, for example, continuous servo-controlled output of a coating head, or device, providing formation of the monitored layer.

It will be recognized that alternating pulses, as well as the illustrated alternating signal component, will appear as the output of the detector, when the test and standard beams are of unequal intensity; however, these pulses have been omitted from the appropriate graphs for the purpose of simplicity.

By reason of the instant apparatus, there is provided the ability to effect the continuous production monitoring of the parameters of the individual layers comprising a continuous web and to simultaneously integrate the results with the continuous fabrication of the web. Specifically, the frequency range of reflected radiation input impressed on the detector may be selected to substantially correspond with the frequency of the maximum natural absorption of the monitored layer, or alternatively, such layer may be suitably doped with a component, such as a dye, pigment, ultraviolet absorber, etc., having a selected maximum frequency range of absorption by, for example, the uniform distribution of such component within the layer to be monitored. Thus, in addition to the ability of the instant apparatus to individually monitor a plurality of layers possessing frequencies of maximum natural absorption at separate areas of the radiation spectrum, the present appartus may be employed to individually monitor a plurality of layers comprising substantially identical compositions possessing substantially identical absorption characteristics by incorporation of separate components, in individual layers, which possess selected, spectrum separated frequencies of absorption.

It will be recognized that, in general, the most efficient generation of measurement signal will be effected as a result of measuring the intensity of reflected radiation at the frequency of the monitored stratum's maximum absorption; but that, where desired, a secondary absorption frequency may be employed, with decreased efficiency, for example, instances in which the maximum absorption frequencies of two or more layers correspond but at least certain of their respective secondary absorption frequencies differ.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for the continuous monitoring of an electromagnetic radiation absorptive continuous web which comprises, in combination, an inspection station, means for moving said web past said inspection station, said inspection station including means for providing electromagnetic radiation incident on one surface of a section of said continuous web passing said inspection station, means contiguous the opposite surface of said section of said web receiving said radiation for reflecting radiation incident thereon, said radiation providing means additionally directing radiation on one surface of an electromagnetic radiation absorptive material having standardized absorption characteristics, means contiguous the opposite surface of said material receiving said radiation for reflecting radiation incident thereon, detector means for producing a signal substantially only in response to the intensity of reflected electromagnetic radiation of selected frequency range incident thereon, and means intermediate said radiation providing means and said detector means for providing sequential impingement of the radiation reflected from said web and from said material on said detector means.

2. Apparatus for the continuous monitoring of an electromagnetic radiation absorptive continuous web which comprises, in combination, an inspection station, means for moving said web past said inspection station, said inspection station including electromagnetic radiation providing means for directing radiation incident on one surface of a section of said continuous web passing said inspection station, means contiguous the opposite surface of said section of said web receiving said radiation for reflecting radiation incident thereon, said radiation providing means additionally directing radiation incident on one surface of an electromagnetic radiation absorptive material having standardized absorption characteristics, means contiguous the opposite surface of said material for reflecting radiation incident thereon, detector means at said inspection station including at least one photoresponsive means for producing a signal substantially only in response to the intensity of reflected electromagnetic radiation of a frequency range substantially corresponding to the frequency range of maximum radiation absorption of said web, and means intermediate said radiation providing means and said detector means for providing sequential impingement of said reflected radiation from said web and said material on said detector means.

3. Apparatus for the continuous monitoring of an electromagnetic radiation absorptive continuous web comprising an inspection station, means for moving said web past said inspection station, said inspection station including means for providing electromagnetic radiation incident on one surface of a section of said continuous web passing said inspection station, said section extending transversely to the motion of said web past said station, means contiguous the opposite surface of said section of said web for reflecting radiation incident thereon, said radiation providing means directing electromagnetic radiation incident on one surface of an electromagnetic radiation absorptive material having a maximum absorption at substantially the same frequency as the radiation absorption maximum of said web, means contiguous the opposite surface of said material for reflecting radiation incident thereon, detector means at said station including at least one photoresponsive means for producing a signal substantially only in response to the intensity of reflected electromagnetic radiation, of the frequency substantially corresponding to the frequency of the radiation absorption maximum of said web, incident thereon, and means intermediate said radiation providing means and said detector means for providing sequential impingement of said reflected radiation from said web and said material on said detector means.

4. Apparatus for monitoring a continuous web comprising a plurality of superposed layers including an electromagnetic radiation absorptive layer and an electromagnetic radiation reflective layer, which apparatus comprises in combination, an inspection station, means for moving said web past said inspection station said station including means for providing electromagnetic radiation incident on one surface of a section of said electromagnetic radiation absorptive layer passing said inspection station, said section extending transversely to the motion of said web past said station, said electromagnetic radiation reflective layer contiguous the opposite surface of said electromagnetic radiation absorptive layer for reflecting electromagnetic radiation incident thereon, said electromagnetic radiation providing means additionally directing radiation incident on one surface of an electromagnetic radiation absorptive material having standardized absorption characteristics, means contiguous the opposite surface of said material for reflecting radiation incident thereon, detector means at said inspection station including at least one photoresponsive means for producing a signal substantially only in response to the intensity of reflected electromagnetic radiation of selected frequency range incident thereon, and means intermediate said radiation providing means and said detector means for providing sequential impingement of said reflected radiation from said web and said material on said detector means.

5. Apparatus for monitoring a continuous web comprising a plurality of layers including two electromagnetic radiation absorptive layers having different maximum absorption frequencies mounted on the same side of an electromagnetic radiation reflective layer, which apparatus comprises, in combination, an inspection station, means for moving said web past said inspection station, said inspection station including means for providing electromagnetic radiation incident on said electromagnetic radiation absorptive layers, at a section of said web passing said inspection station, said radiation providing means additionally directing radiation incident on one surface of an electromagnetic radiation absorptive material having standardized absorptive characteristics, means contiguous the opposite surface of said material for reflecting radiation incident thereon, detector means for selectively producing a signal substantially only in response to the intensity of reflected electromagnetic radiation substantially corresponding to the maximum absorption frequency range of one of said electromagnetic radiation absorptive layers, and means intermediate said radiation providing means and said detector means for providing sequential impingement of said reflected radiation from said web and said material on said detector means.

6. Apparatus for monitoring a continuous web comprising a plurality of layers including an electromagnetic radiation absorptive layer having a maximum absorption frequency within the ultraviolet spectrum contiguous an electromagnetic radiation reflective layer, which apparatus comprises, in combination, an inspection station, means for moving said web past said inspection station, means for providing ultraviolet electromagnetic radiation incident on a section of said absorptive layer passing said inspection station, said radiation providing means directing radiation incident on one surface of a radiation absorptive material having standardized absorption characteristics, means contiguous the opposite surface of said material for reflecting radiation incident thereon, detector means at said inspection station including at least one photoresponsive means for producing a signal substantially only in response to the intensity of reflected radiation substantially corresponding to the frequency of said absorptive layer's maximum ultraviolet radiation absorption range, and means intermediate said radiation providing means and said detector means for providing sequential impingement of said reflected radiation from said web and said material on said detector means.

7. Apparatus for monitoring an electromagnetic radiation absorptive web which comprises, in combination, an inspection station, means for moving said web past said inspection station, said inspection station including means for providing electromagnetic radiation incident on one surface of a section of said continuous web passing said inspection station, said section extending transversely to the motion of said web past said station, means contiguous the opposite surface of said section of said web for reflecting radiation incident thereon, said radiation providing means additionally directing electromagnetic radiation incident on one surface of an electromagnetic radiation absorptive material having standardized absorption characteristics, means contiguous the opposite surface of said material for reflecting electromagnetic radiation incident thereon, detector means at said inspection station including at least one photoresponsive means for producing a signal substantially only in response to the intensity of diffuse reflected electromagnetic radiation of selected frequency range incident thereon, and means for providing sequential impingement of said reflected radiation from said web and said material on said detector.

8. Apparatus for monitoring an electromagnetic radiation absorptive continuous web which comprises, in combination, an inspection station, means for moving said web past said inspection station, said inspection station including means for providing electromagnetic radiation incident on one surface of a section of said continuous web passing said inspection station, said section extending transversely to the motion of said web past said station, means contiguous the opposite surface of said web receiving said radiation for reflecting electromagnetic radiation incident thereon, said radiation providing means additionally directing radiation incident on one surface of an electromagnetic radiation absorptive material having standardized absorption characteristics, means contiguous the opposite surface of said material for reflecting electromagnetic radiation incident thereon, detector means including at least one photoresponsive means for producing a signal substantially only in response to the intensity of reflected electromagnetic radiation incident thereon, filter means intermediate said radiation providing means and said detector means for selecting the frequency range of radiation incident on said detector means, means intermediate said radiation providing means and said detector means for providing sequential impingement of said reflected radiation from said web and said material on said detector means, and means for utilizing said generated signal.

9. An apparatus as defined in claim 8 wherein said filter means are intermediate said radiation providing means and at least one of said web and said material.

10. An apparatus as defined in claim 8 wherein said utilizing means includes means for amplifying said generated signal.

11. An apparatus as defined in claim 10 including phase discriminator circuit means for converting said amplified signal to a unidirectional signal.

12. An apparatus as defined in claim 11 including means for registering the polarity and amplitude of said unidirectional signal.

References Cited

UNITED STATES PATENTS

| 2,900,513 | 8/1959 | Duffy | 250—209 X |
| 2,978,589 | 4/1961 | Howell | 250—233 |
| 3,016,464 | 1/1962 | Bailey | 88—14 X |
| 3,017,512 | 1/1962 | Wolbert | 88—14 X |

WALTER STOLWEIN, *Primary Examiner.*